US012650249B1

(12) United States Patent
Wang

(10) Patent No.: US 12,650,249 B1
(45) Date of Patent: Jun. 9, 2026

(54) HYBRID REGENERATOR FOR CRYOCOOLER

(71) Applicant: Chao Wang, Boxborough, MA (US)

(72) Inventor: Chao Wang, Boxborough, MA (US)

(73) Assignee: Boston Cryogenics LLC, Billerica, MA (US)

( * ) Notice: Subject to any disclaimer, the term of this patent is extended or adjusted under 35 U.S.C. 154(b) by 585 days.

(21) Appl. No.: 18/081,482

(22) Filed: Dec. 14, 2022

Related U.S. Application Data

(60) Provisional application No. 63/300,482, filed on Jan. 18, 2022.

(51) Int. Cl.
*F25B 9/00* (2006.01)
*B33Y 80/00* (2015.01)

(52) U.S. Cl.
CPC .............. *F25B 9/002* (2013.01); *B33Y 80/00* (2014.12); *F25B 2309/003* (2013.01)

(58) Field of Classification Search
CPC .... F25B 9/002; F25B 9/10; F25B 9/14; F25B 9/145; F25B 2309/003; F25B 2309/1418; F25B 2309/1408; B33Y 80/00
See application file for complete search history.

(56) References Cited

U.S. PATENT DOCUMENTS

| | | | | |
|---|---|---|---|---|
| 4,359,872 | A | 11/1982 | Goldowsky | |
| 4,835,973 | A * | 6/1989 | Jones | F25B 9/14 |
| | | | | 62/6 |
| 8,991,196 | B2 | 3/2015 | Xu | |
| 9,086,231 | B2 | 7/2015 | Xu | |
| 2012/0304668 | A1 * | 12/2012 | Xu | F25B 9/14 |
| | | | | 62/6 |
| 2019/0323737 | A1 * | 10/2019 | Hoehne | F25B 9/145 |
| 2021/0284548 | A1 * | 9/2021 | Yamada | C01F 17/206 |

* cited by examiner

*Primary Examiner* — Frantz F Jules
*Assistant Examiner* — Webeshet Mengesha
(74) *Attorney, Agent, or Firm* — Wells St. John P.S.

(57) ABSTRACT
A low temperature regenerator for a cryocooler includes a hybrid regenerative portion having regenerative materials of helium gas ("regenerative helium") combined with rare earth materials. Helium is also used as the refrigerant in the cryocooler ("working helium"). Regenerative helium is contained in one or more regenerative networks of connected hollow regenerative channels or hollow tube(s). The one or more regenerative networks have at least one micro-opening to allow gas exchange between working helium and regenerative helium during the cryocooler operation. The regenerative networks include regenerative channels in one or more layers. Flow passages of working helium between the regenerative channels within each layer and between two adjacent layers of the regenerative networks are filled with particles of rare earth materials. The working helium exchanges heat with regenerative helium and rare earth materials, through the wall of the regenerative channels or hollow tubes and the surfaces of the rare earth materials.

13 Claims, 10 Drawing Sheets

Elevational Front View

Sectional View A-A

Sectional View B-B

Elevational Front View

Sectional View A-A

Sectional View B-B

HYBRID REGENERATOR FOR CRYOCOOLER

CROSS REFERENCE TO RELATED APPLICATIONS

This application claims priority to U.S. Application Ser. No. 63/300,482, entitled: HYBRID REGENERATOR FOR CRYOCOOLER, filed Jan. 18, 2022 under relevant portions of 35 U.S.C. § 119 and 35 U.S.C. § 120. The entire contents of the referenced application is incorporated by reference in its entirety.

FIELD OF INVENTION

The application generally pertains to the field of closed-cycle regenerative-type cryocoolers operating at cryogenic temperatures below 15 K. More particularly, the application pertains to low temperature regenerators used in the cryocooler.

BACKGROUND

Closed-cycle regenerative cryocoolers, such as Gifford-McMahon (GM) cryocoolers, pulse tube (PT) cryocoolers and Stirling cryocoolers, employ a regenerative heat exchanger, called a "regenerator", between the compression and expansion spaces. The regenerator, made of, for example, fine mesh screens or densely packed particles with good specific heat properties, performs as a thermodynamic sponge, alternatively releasing and absorbing heat in a periodic cycle.

In order to reach sufficiently low temperatures, cryocoolers normally employ two stage expansions. FIG. 1 shows a schematic of a two-stage PT cryocooler. The PT cryocooler consists of a pressure wave generator 30 used to supply periodically oscillating gas pressure to a two-stage expansion device (the so called "cold head") in order to achieve cryogenic temperatures. The first stage of the cold head mainly includes a first stage regenerator 6, a first stage cold heat exchanger 5, a first stage pulse tube 3, a first stage warm heat exchanger 1 and a first stage cooling station 9. The second stage of the cold head mainly includes a second stage regenerator 12, a second stage cold heat exchanger 10, a second stage pulse tube 4, a second stage warm heat exchanger 8 and a second stage cooling station 11. The first stage warm heat exchanger 1 and the second stage warm heat exchanger 8 connect to phase shifters 31 and 32, respectively, for obtaining desired cooling performances. The first stage normally operates at temperatures of 30-80 K, and the second stage operates at temperatures of 2-20 K.

The first stage regenerator 6 consists of a regenerator housing 6a and regenerative materials 6b. The first stage regenerative materials 6b are usually made of phosphor bronze screen or stainless steel (SS) screens.

The second stage regenerator 12 consists of a regenerator housing 12a and regenerator materials of 12b and 12c. In order to obtain a cooling temperature below 4 K, the second stage regenerator is normally packed with two types of regenerative materials in two separate portions. The first portion regenerative material 12b consists of particles of lead, or tin or bismuth and the second portion regenerative material 12c consists of particles of rare earth materials, such as Er₃Ni, or HoCu₂. A divider 13 separates the two portions of the regenerative materials.

The second stage regenerator may alternatively be packed with three types of regenerative materials in three separate portions in some cryocoolers, as shown in FIG. 2. The first portion regenerative materials 12b are particles of lead, or tin or bismuth, the second portion regenerative materials 12c are particles of Er₃Ni, or HoCu₂, and the third portion regenerative materials 12d are particles of Gd₂O₂S. Dividers 13 are used to separate each portion of the regenerative materials.

The regenerator ineffectiveness is closely related to the capacity ratio $C_r/C_g$, which is given by $$\frac{C_r}{C_g} = \frac{m_r c_{pr}}{\dot{m}_g c_{pg} \theta_H}$$

in which $C_r$ is the heat capacity of the regenerator matrix, $C_g$ is the heat capacity of the gas flowing per pulse period, $m_r$ is the mass of the matrix, $C_{pr}$ is the specific heat of the matrix, $\dot{m}_g$ is the mass flow rate of the gas, $C_{pg}$ is the specific heat of the gas, and $\theta_H$ is the period of heating. $C_r$ should be higher than $C_g$ for an effective regenerator.

FIG. 3(a) shows the specific heat of helium gas and some typical regenerative materials used in the regenerators. The pressure of helium gas is at 1.4 MPa, which is close to the average pressure in cryocoolers. Due to the very low specific heat of lead, or tin or bismuth and the real gas effects of helium gas below 10 K, the ratio of $C_r/C_g$ is very small (<<1). With these materials, a two-stage cryocooler normally can reach a no-load temperature of ~7 K.

FIG. 3(b) shows some rare earth materials used in cryocoolers below 4 K. The rare earth materials, such as Er₃Ni, HoCu₂ and Gd₂O₂S, have a high peak specific heat due to the magnetic phase transition at the temperature below 10 K. However, almost all existing rare earth materials have less specific heat near 4 K than that of helium gas, and they are much more expensive than helium gas.

Helium is also a working gas (refrigerant) in a closed-cycle regenerative cryocooler. Helium gas has been considered and discussed as a regenerative material for a period of time because of its high specific heat near 4 K. For purposes of this and all following discussions, helium gas used as working gas is referred to as "working helium", and helium gas used as regenerative material is referred to as "regenerative helium" hereinafter.

A plurality of closed hollow glass spheres or closed end woven tubes containing regenerative helium were suggested to be regenerative components used in the low temperature regenerator described in U.S. Pat. No. 4,359,872. The suggested spheres and woven tubes have to contain very high-pressure helium gas at room temperature in order to maintain a desired gas pressure for high specific heat at low temperatures. This regenerator would be very difficult to make and the manufacturing cost would be extremely high.

U.S. Pat. Nos. 9,086,231 and 8,991,196 introduce regenerative vessels containing regenerative helium in a regenerator wherein the regenerative vessels connect to a high or low-pressure supply of working helium in the cryocooler to maintain the pressure of regenerative helium in the regenerative vessels. While the connecting line used in this latter configuration can avoid high pressure use of regenerative helium in the regenerative vessels, there is increased system complexity as well as overall manufacturing cost. In one embodiment of the invention described in U.S. Pat. No. 9,086,231, metal filler in combination with regenerative helium is filled in the regenerative vessels.

Hollow vessels containing regenerative helium, equipped with pressure-equalizing openings (micro-openings), were introduced as regenerative components for the regenerator described in U.S. Patent Application Publication No. US 2019/0323737. Regenerative helium contained in the vessel changes pressure by a maximum of 20% during a periodic cycle of the cryocooler by exchanging gas with working helium. However, each layer of the regenerative vessels has pressure-equalizing holes, which could bring too much flow interruption to the working helium flow and thereby reduce the performance.

In all prior suggested embodiments of helium regenerative components, the flow passages for the working helium are gaps formed by the helium regenerative components. The heat transfer area between the working helium and the regenerative components is fairly small. The flow of the working gas could be a laminar flow with lower heat transfer coefficient. Therefore, the regenerators with helium regenerative components cannot fully utilize the heat capacity of the helium contained in the regenerative vessel, which results in lower regenerator efficiency. Also, the manufacturing cost of the prior suggested embodiments is very high. To date, a practical application of helium regenerator has not been seen in publications.

One objective of the present teaching is to provide efficient solutions for a low temperature regenerator using helium gas as a regenerative material. A further objective of the present teaching is to reduce the manufacturing cost of low temperature regenerators.

SUMMARY OF THE INVENTION

For purposes of the following described embodiments, the following terms are defined for clarity:

"Regenerative channel" or "regenerative tube" as used herein refers to defined enclosed spaces that retain regenerative helium as a regenerative material in accordance with some aspects of the teaching.

Regenerative network" as used herein refers to one or more connected regenerative channels or hollow tubes that are configured in at least one layer within the regenerator.

"Independent regenerator network" as used herein refers to a regenerative network in which any layer or layers of channels are connected with the same pressure of regenerative helium, which is independent from other regenerative networks.

"Working helium" as used herein refers to the refrigerant gas used in the cryocooler.

"Regenerative helium" as used herein refers to helium that is used as a regenerative material in the channels or tubes for the inventive regenerator.

The present teaching discloses a hybrid regenerator used in a cryocooler by combining regenerative helium and rare earth materials as regenerative materials to provide high heat capacities and large heat transfer area. Helium gas as the regenerative material is contained in one or more closed networks of connected hollow regenerative channels, hereinafter interchangeably referred to as regenerative networks, which may be located in certain portions of the regenerator, preferably a lower portion. Each independent regenerative network with the same regenerative helium pressure is provided with at least one micro-opening to exchange gas between working helium and regenerative helium. Regenerative networks may consist of one or more hollow channels or channels organized in any suitable type of topology, including but not limited to, for example, mesh, star, tree, bus, ring or a hybrid of multiple topologies, and may be organized in layers. Each layer may include one or more independent networks made up of regenerative channels. Alternatively, regenerative networks of multiple layers may be connected via connecting channels across two or more layers as an independent network having the same pressure of regenerative helium.

There are gaps provided between the regenerative channels within each layer and between any two adjacent layers of the regenerative networks, in which the gaps function as the flow passages for the working helium. These flow passages are filled with particles of rare earth materials to surround the regenerative channels containing the regenerative helium. The heat transfer area between the working helium and the regenerative materials are the wall of the regenerative channels and the surfaces of the rare earth materials. Both the regenerative helium/regenerative network and rare earth materials provide regenerative function of the regenerator. Therefore, the mixed regenerative components could provide high heat capacity and large heat transfer area.

The micro-openings provided on the regenerative networks allow the networks to maintain a desired pressure of the regenerative helium during the cryocooler operation by exchanging gas with the working helium outside of the regenerative networks.

In one embodiment of the present teaching, the regenerative networks can be made by an additive manufacturing process (3-D printing) using heat conductive materials. In another embodiment of the present teaching, the regenerative network can be a coiled tube and at least one micro-opening may be provided at the end of each independent tube.

BRIEF DESCRIPTION OF THE DRAWINGS

FIG. 5(a) is an elevational front view of the hybrid regenerator, FIG. 5(b) is a sectioned view taken through line A-A of FIG. 5(a), and FIG. 5(c) is a sectioned view taken through line B-B of FIG. 5(b).

FIG. 8(a) is an elevational front view of the hybrid portion, FIG. 8(*b*) is a sectioned view taken through line A-A of FIG. 8(*a*), and FIG. 8(*c*) is a sectioned view taken through line B-B of FIG. 8(*b*).

DETAILED DESCRIPTION OF THE INVENTION

Helium gas is a preferred regenerative material for a low temperature regenerator since it has large specific heat below the temperature of 15 K. The present teaching discloses a hybrid regenerator with high specific heat and large heat transfer areas by combining regenerative helium and rare earth materials as regenerative materials. Descriptions of various embodiments are given below, with reference to FIGS. 4-8(*c*).

Figure 1:
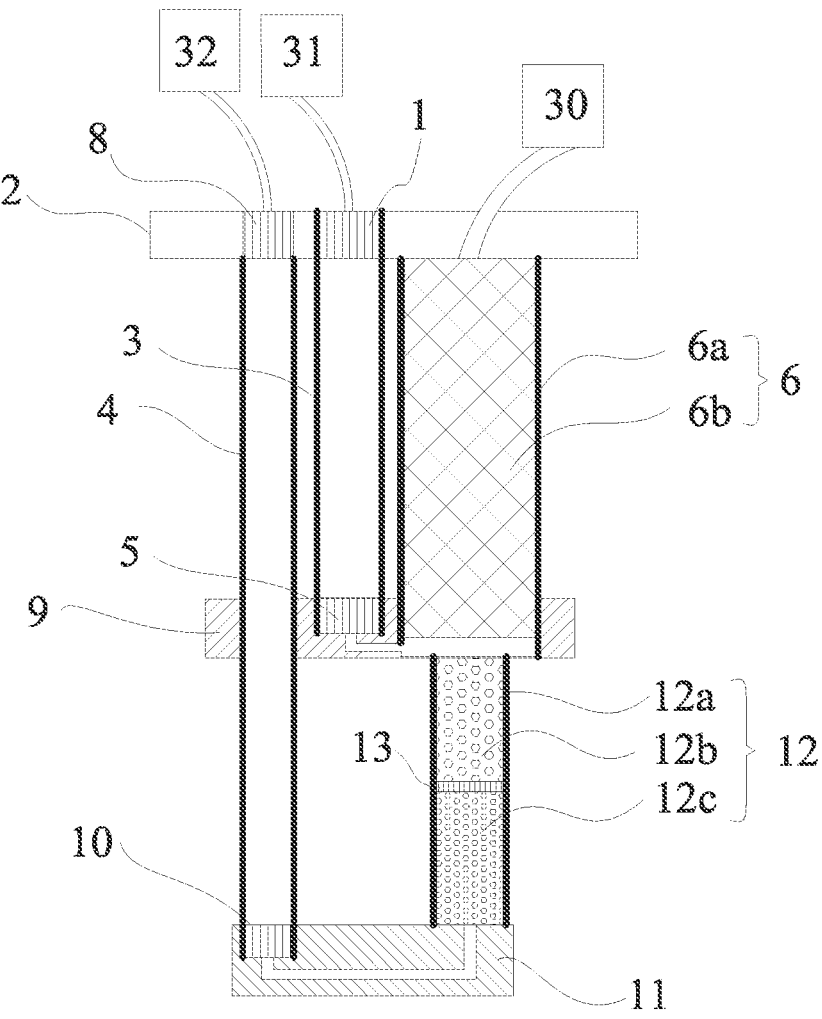
FIG. 1 shows a schematic of a prior art two-stage PT cryocooler wherein the second stage regenerator is packed with two types of spherical regenerative materials in two separate portions.
Figure 2:
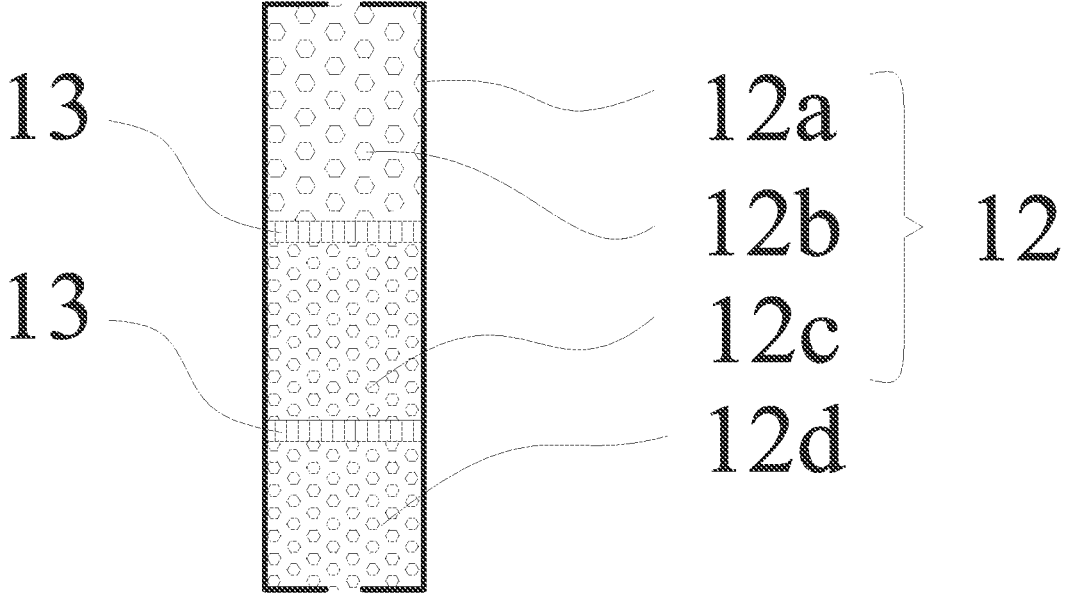
FIG. 2 shows a schematic of a prior art second stage regenerator packed with three types of regenerative materials in three separate portions.
Figure 3A:
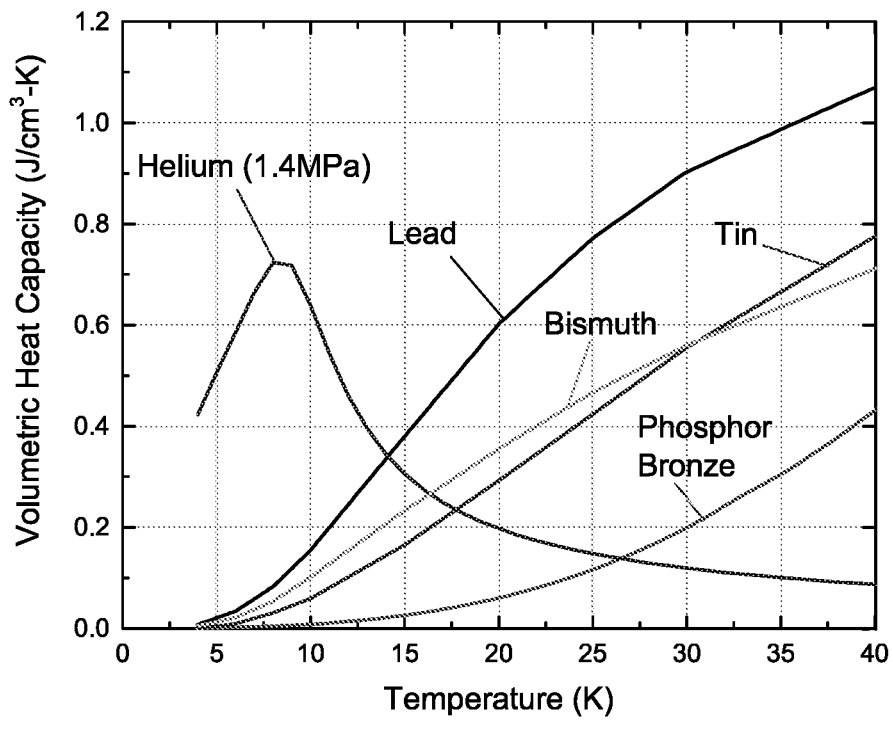
FIGS. 3(a) and 3(b) show comparisons of the specific heat of low temperature regenerative materials and helium gas.
Figure 3B:
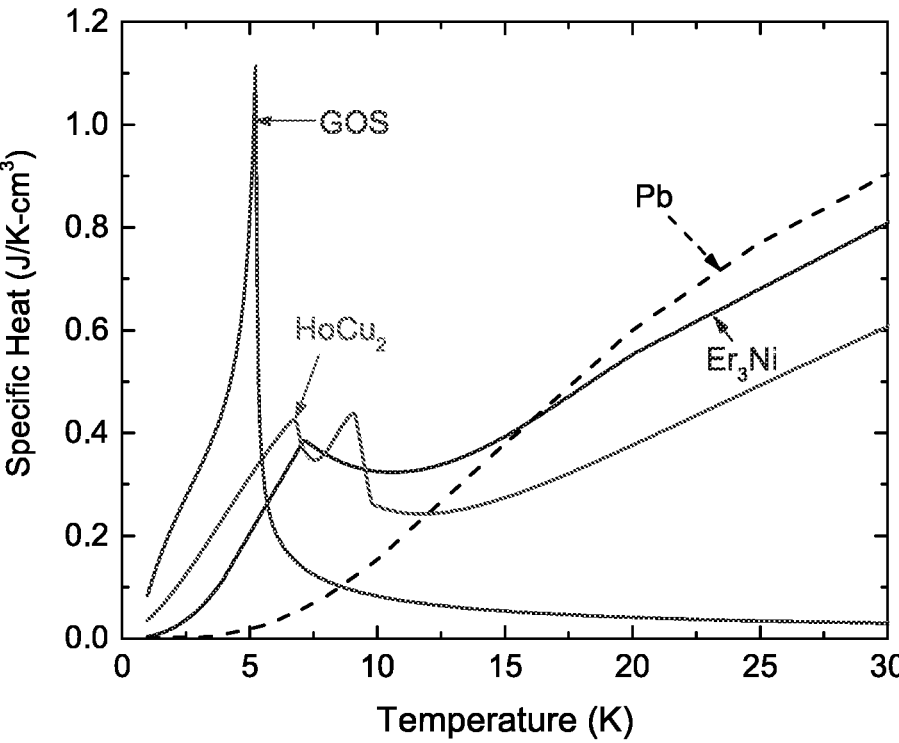
Figure 4:
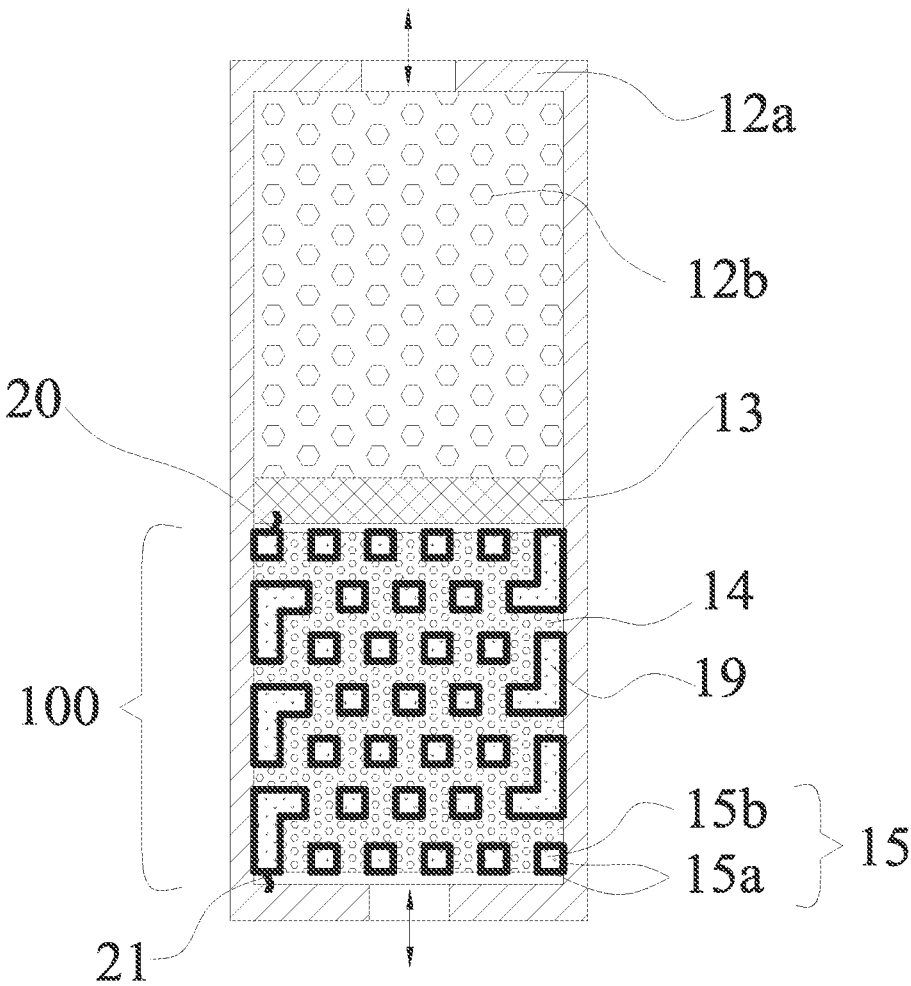
FIG. 4 shows a schematic of an exemplary hybrid regenerator with a lower portion containing regenerative networks which are filled with regenerative helium, and rare earth materials filling the flow passages of working helium outside the regenerative networks in accordance with an embodiment of the present teaching.

FIG. 4 shows an embodiment of an exemplary hybrid regenerator used for a cryocooler. A regenerator housing 12*a*, made from low thermal conductive materials such as stainless steel or some non-metallic materials, has openings at opposing upper and lower ends to allow working helium flow in and out of the housing 12*a*. The regenerator housing 12*a* could be a regenerator tube, such as shown in FIG. 1 or a specific housing, such as shown in FIG. 2. The regenerator may be divided into two portions packed with different regenerative materials and are divided into an upper portion and a lower portion according to this embodiment. The upper portion regenerative materials 12*b*, operating at a higher operating temperature range of roughly above 15 K, may be particle materials with higher specific heat above 15 K, such as lead, tin or bismuth. The lower portion 100 of the regenerator may be packed with hybrid regenerative elements which is shown in details in FIGS. 5(*a*)-(*c*), combining networks 16 of regenerative channels 15 and rare earth materials 14. Each regenerative channel 15 consists of a series of contiguous walls 15*a* and a hollow interior space 15*b* for containing the regenerative helium. The walls 15*a* of the channels 15 may be made from metal materials, such as copper and stainless steel, or non-metallic materials having acceptable thermal conductivity. There may be two micro-openings 20 and 21 at the top and bottom networks 16, respectively, to equalize the gas pressures between the regenerative helium and the working helium. A divider 13 separates the upper portion of the regenerative materials 12*b* and the hybrid lower portion 100.

Figure 5:
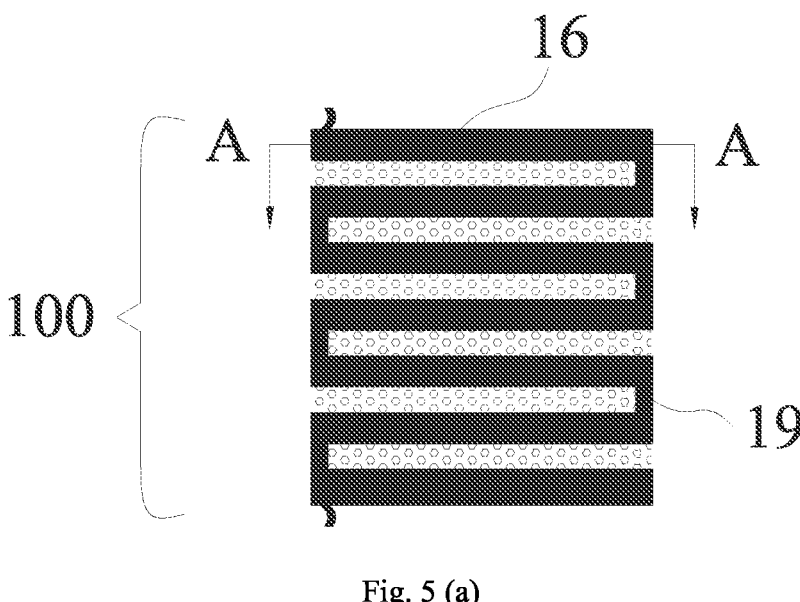
FIGS. 5(a)-5(c) show three views of the lower portion of the exemplary hybrid regenerator depicted in FIG. 4, which is packed with the regenerative networks and rare earth materials. More specifically.
Figure 5:
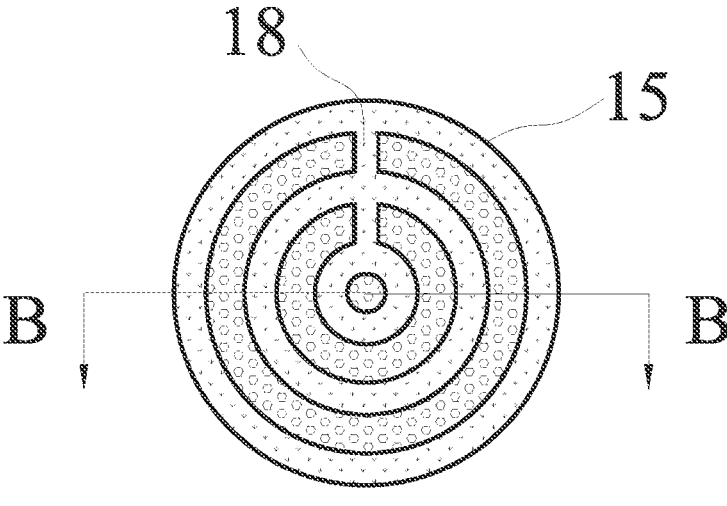
Figure 5:
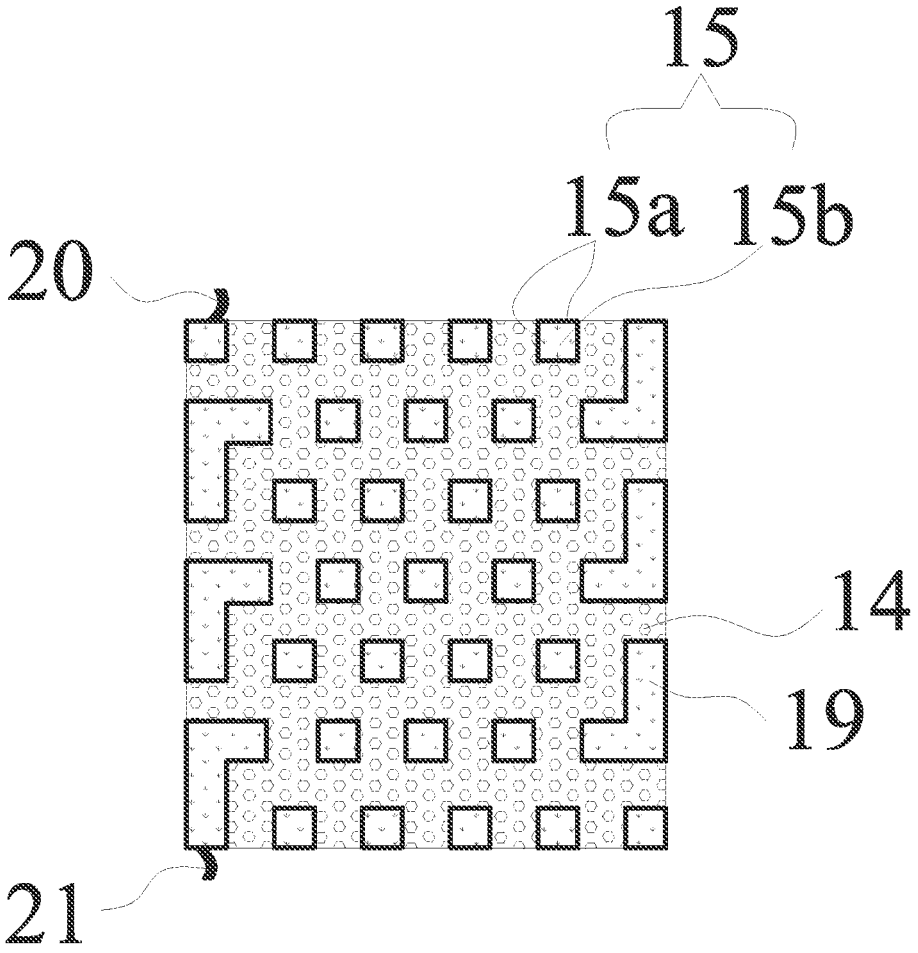

FIGS. 5(*a*)-5(*c*) shows details of the hybrid lower portion 100 in the regenerator, which consists of multiple layers of the regenerative networks 16. According to this specific embodiment, seven (7) layers are provided although the precise number of layers can be suitably varied. Each layer of the regenerative network 16 according to this specific embodiment consists of a group of hollow channels 15, which have a hollow space 15*b* enclosed by the contiguous walls 15*a* for containing the regenerative helium. The channels 15, shown as rectangular in cross section according to this embodiment can be formed from any convenient hollow shape including circular, polygonal, square, triangular, etc. The channels 15 in each layer may be gas-connected by a horizontal channel 18, as shown in FIG. 5(*b*). Each layer of the regenerative network 16 may be gas-connected together by a vertical channel 19, as shown in FIGS. 4 and 5(*a*). Therefore, the helium gas pressure in each regenerative channel 15 may be same if all the channels 15, 18, 19 are connected as one independent network. The width of the hollow space 15*b* inside each hollow channel 15, 18, 19 according to this embodiment can be 0.1-3 mm with a wall thickness of ~0.05-0.3 mm.

The channels 15 in each layer are staggered in FIGS. 5(*a*)-5(*c*) for enhancing the heat transfer between the working helium and the wall 15*a* of the hollow channel 15.

Figure 6:
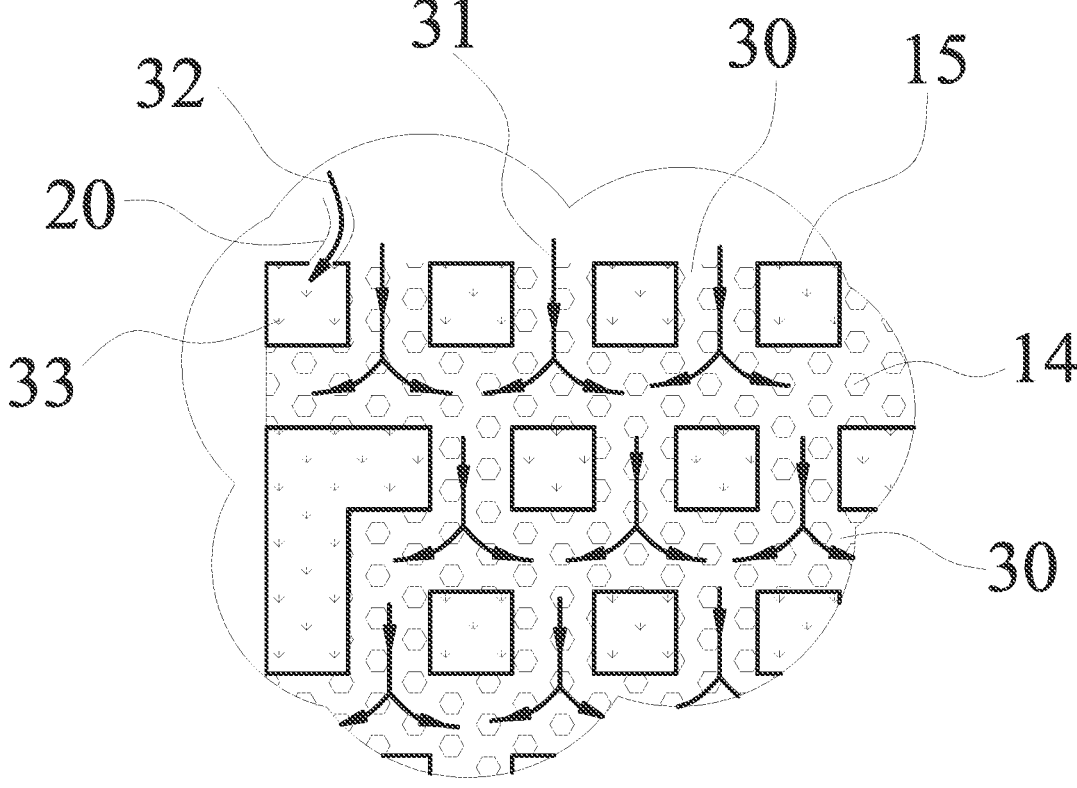
FIG. 6 is a partial view depicting gas exchange between working helium and regenerative helium as well as the flow of working helium in the hybrid regenerator of FIGS. 4-5(c) in a high-pressure period of a cycle.

FIG. 6 shows details of the flow of the working helium 31 and gas exchange between the working helium 31 and regenerative helium 33 in a high-pressure period of a cycle. In a low-pressure period of a cycle, the flows of working helium and gas exchange are reversed.

The regenerative helium 33 is contained within the hollow space 15*b* of the regenerative channel 15. The flow passages 30 among the regenerative channels 15 for the working helium gas, either in the vertical or horizontal directions, are designed to have a suitable width of 0.1-3 mm for filling with particles of the rare earth materials 14. The rare earth materials 14 may have sizes of ca. 0.1 mm~0.5 mm. Accordingly, the regenerative channels 15 are surrounded by the particles of the rare earth materials 14. Adding the particles of rare earth materials 14 in the flow passages 30 of the working helium increases the heat transfer area and results in turbulent flow of the working helium. Thus, the herein described arrangement significantly enhances the heat transfer between the working helium and the surfaces of the regenerative elements, including the regenerative channels 15 and the rare earth materials 14. The heat conduction, between the walls 15*a* of the regenerative channels 15 and the surfaces of the rare earth particles 14, is expected to better utilize the heat capacity of the regenerative helium.

The one or more regenerative networks 16 may be made by additive manufacturing of 3-D metal printing. The axial conduction loss of the channel connection is negligible since it needs only one connection in axial direction (vertical) with very small temperature gradient. The cross section of each of the regenerative channels 15 in FIGS. 4 and 5(*a*)-5(*c*) is defined by a substantially rectangular shape, but as previously noted other shapes, e.g. circular, pentagonal and triangular can also be used.

As previously noted, two micro-openings 20 and 21 are provided at the top layer and bottom layer of the one or more regenerative networks 16 to exchange gas between the regenerative helium 33 in the channels 15 and the working helium 31. The micro-openings 20, 21 are made to have a large flow resistance so that the regenerative channels 15 can maintain almost the average pressure of the periodic oscillating pressure of the working helium in the regenerator. In one embodiment of a practical design, one micro-opening may be provided at the bottom of the regenerative channel in order to reduce the interruption of the working helium flow. However, the micro-opening can be provided at any location on the regenerative channels.

In a variation of the embodiment shown in FIGS. 5(*a*)-5(*c*), each layer of the one or more regenerative networks 16 may be closed without any connections with other layers, thereby creating one or more independent networks. At least one micro-opening is provided in each independent regenerative network.

In another variation of the embodiment in FIGS. 5(*a*)-5(*c*), two or more layers of a regenerative network may be connected together by vertical channels 19, thereby creating multi-layer independent regenerative networks. At least one micro-opening is provided in each independent regenerative network.

Figure 7:
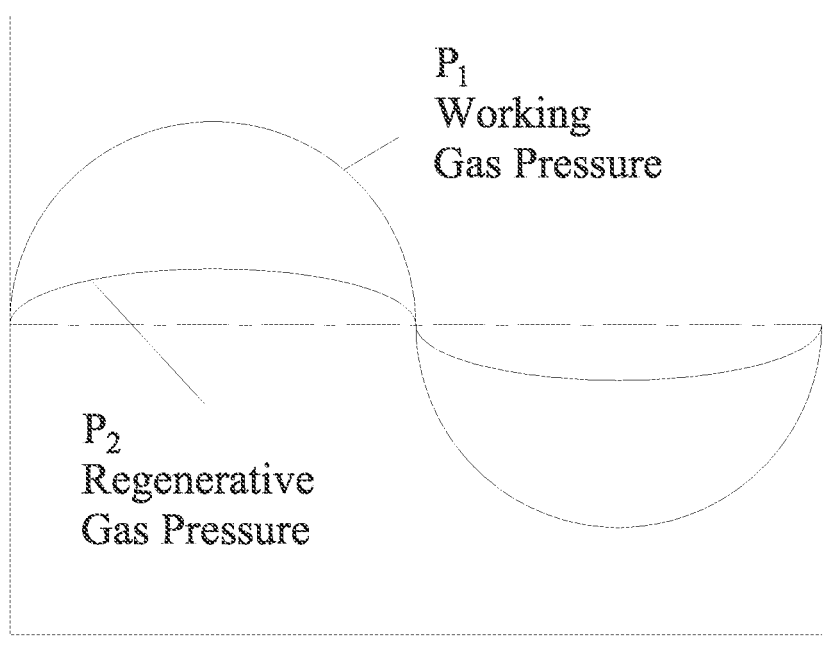
FIG. 7 illustrates the oscillating pressures of working helium and regenerative helium in the regenerator.

FIG. 7 schematically illustrates the periodic pressure of working helium $P_1$ and the pressure of regenerative helium $P_2$ in the regenerator. The size of the micro-openings is so small that the disturbance of the mass flow of working helium could be negligible. The pressure oscillation of regenerative helium is determined by the size of the micro-openings. Pressure oscillation of the regenerative helium could be in the range of 1% to 25% of that of the working helium. In the high-pressure period of a cycle, the micro-openings allow a small amount of working helium flowing into the regenerative channels. In the low-pressure period of the cycle, a small amount of regenerative helium gas flows out of the regenerative channels through the micro-openings.

The volume flow rate through a micro-opening can be defined as:

$$V = Af(P_1 - P_2)$$

The volume flow rate V is proportional to the area of micro-opening A and is related to a function of pressure differential $(P_1 - P_2)$, where f refers to a function of the pressure differential.

During the cold head cool-down from room temperature, the temperature of regenerative helium decreases as does the pressure of regenerative helium. Working helium continuously flows into the regenerative channels to maintain regenerative helium pressure, which is close to the average pressure of the oscillating pressure of the working gas.

Figure 8:
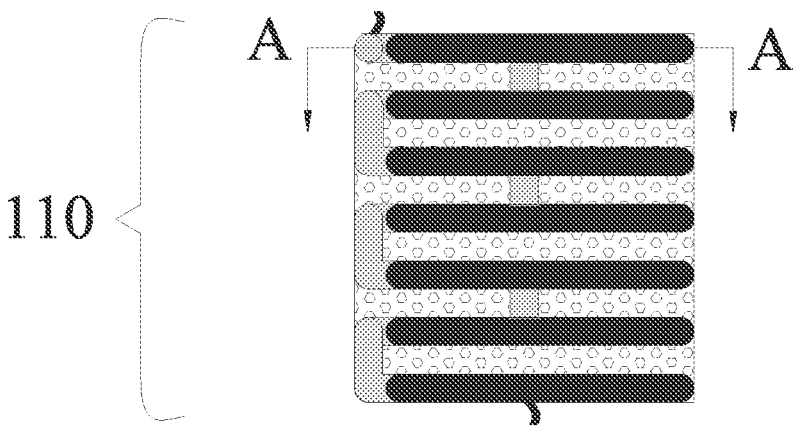
FIGS. 8(a)-8(c) shows schematics of the hybrid portion of an exemplary hybrid regenerator packed with regenerative networks, which are made of tubes, and rare earth materials in accordance with another embodiment of the present teaching. More specifically.
Figure 8:
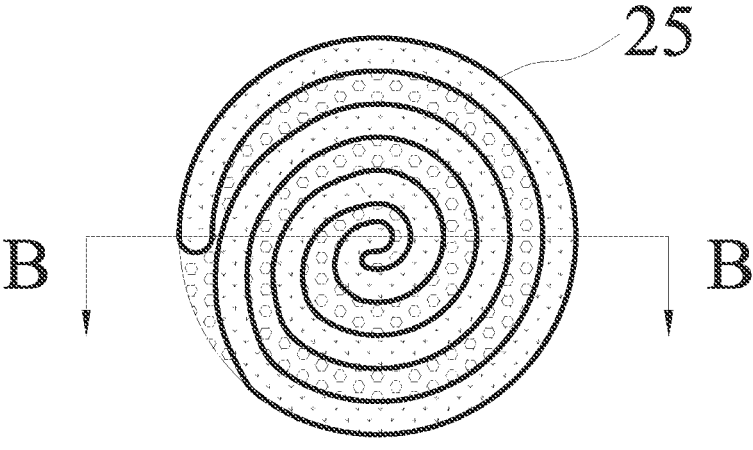
Figure 8:
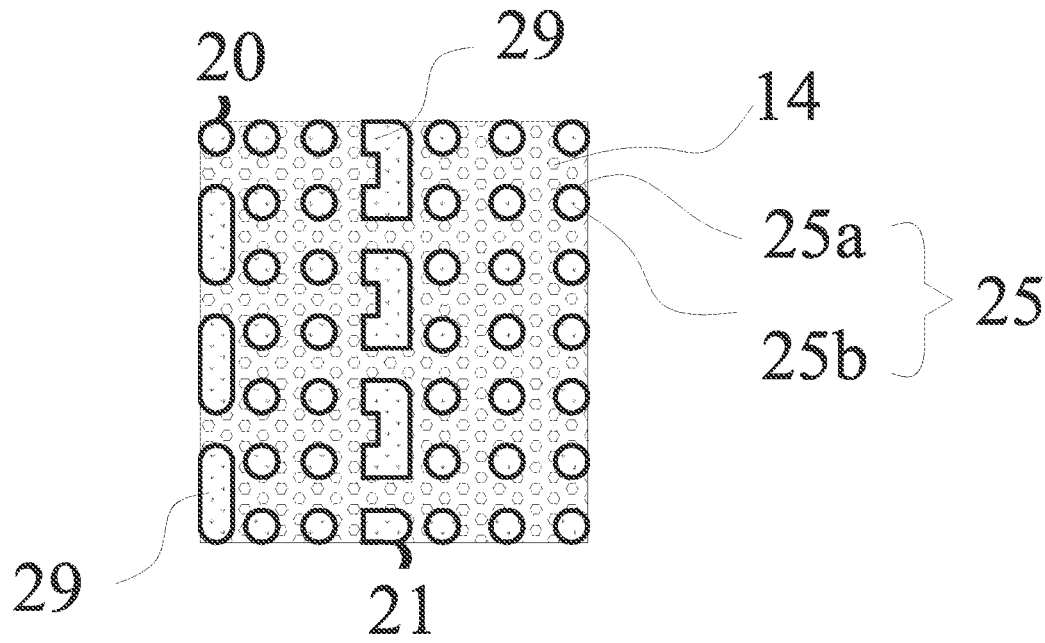

FIGS. 8(a)-8(c) shows schematics of a hybrid portion of an exemplary hybrid regenerator in accordance with another embodiment of the present teachings. In this embodiment, all layers of the one or more regenerative network of channels may be made by a hollow metal regenerative tube 25, which consists of a tube wall 25a and an interior space 25b. The metal tube 25 according to this embodiment may be coiled as a spiral configuration in each layer, as shown in FIGS. 8(a), 8 (b) and 8(c). Alternatively, each layer may have other configurations such as serpentine or mesh, etc.

The flow passages of working helium between two turns in one layer and the flow passages between each layer may be 0.1 mm to 3 mm. Each layer of the coiled or otherwise disposed regenerative tube 25 may be connected by a vertically extending channel 29 of the regenerative tube 25. The coiled pattern for each layer of the regenerative tube 25 can be in alignment as depicted in FIGS. 8(a)-8(c) or staggered as that shown previously in FIGS. 5(a)-5(c). Particles of regenerative materials 14 are packed in the flow passages and surround the hollow regenerative tube 25. Both ends of the hollow regenerative tube 25 may be closed and provided with micro-openings 20 and 21. In another embodiment, one micro-opening may be provided only at one end of the regenerative tube 25. In another embodiment, one or more micro-openings may be provided at preferred locations on the regenerative tube 25.

In a variation of the embodiment in FIGS. 8(a)-8(c), each layer of the coiled or otherwise disposed tube 25 may be made independently with closed ends, i.e., no connections across layers by the vertically extending channel 29. At least one micro-opening is provided on each layer of the coiled tube or otherwise disposed regenerative tube 25.

In another variation of the embodiment in FIGS. 8(a)-8 (c), two or more layers of the coiled or otherwise disposed regenerative tube 25 may be connected together by the vertically extending channels 29. The connected layers perform as one independent regenerative network. At least one micro-opening is provided on each independent regenerative network.

The embodiments in FIGS. 5(a)-5(c) and FIGS. 8(a)-8(c) have an annular form and spiral form of the one or more regenerative channels in each layer, respectively. However, the regenerative channels can be disposed in any suitable form having an internal hydraulic diameter in the range of 0.1 mm to 10 mm.

In order to increase the thermal conduction between the surfaces of the regenerative channels and the particles of the regenerative materials, any suitable method of binding them together, such as sintering or gluing, can be used in the present teaching.

Although the present teaching has been described with certain specific embodiments for instructional purpose, the present teaching is not limited thereto. Accordingly, various modifications, adaptations and combinations of various features of the described embodiments can be practiced without departing from the scope of the teaching as set forth in the claims.

What is claimed is:

1. In a regenerative cryocooler, a low-temperature regenerator comprising:
   a regenerator housing with openings on opposing ends, the regenerator housing containing one or more portions of regenerative materials, wherein at least one portion is a hybrid portion containing:
   one or more independent regenerative networks comprising hollow channels filled with helium gas as a regenerative material, referred to as regenerative helium;
   particles of regenerative materials filling flow passages of working helium outside the one or more independent regenerative networks, wherein working helium flows through surfaces of particles of regenerative materials and outer surfaces of the one or more independent regenerative networks; and
   at least one micro-opening being provided on each of the one or more independent regenerative networks to allow gas exchange between working helium and regenerative helium.

2. The regenerator of claim 1, wherein the one or more independent regenerative networks comprise one or more connected regenerative channels, which can be organized in at least one shape and flow passages of working helium between an exterior of the one or more connected regenerative channels, said flow passages being filled with the particles of regenerative materials.

3. The regenerator of claim 2, wherein the one or more connected regenerative channels are organized within the regenerator housing according to a predefined arrangement or shape.

4. The regenerator of claim 3, wherein the predefined shape is at least one of a ring, mesh, spiral, star, bus or tree shape.

5. The regenerator of claim 2, in which the one or more independent regenerative networks can be further organized in layers, wherein one or more layers can function as an independent regenerative network with flow passages of working helium between layers, wherein:
   regenerative materials are filled in the flow passages.

6. The regenerator of claim 2, wherein the one or more independent regenerative networks are further organized in layers having vertical channels connecting one or more independent regenerative networks of two or more layers, wherein the regenerative helium has the same pressure in all connected regenerative networks on which at least one micro-opening is provided, the regenerator further comprising:
   the flow passages of working helium between layers, wherein the one or more portions of the regenerative materials are filled in the flow passages.

7. The regenerator of claim 2, in which the cross sectional area of each of the one or more connected regenerative channels is defined by a hollow structure, having a shape formed by at least one of circular, square, rectangular, triangular and polygonal.

8. The regenerator of claim 1, wherein each of the at least one micro-opening is one of a micro-hole or a capillary tube.

9. The regenerator of claim 1, wherein the one or more independent regenerative networks, including the one or more connected regenerative channels, are made as one unit by additive manufacturing of 3-D printing.

10. The regenerator of claim 1, wherein the one or more portions of the regenerative materials are bonded on outside surfaces of the channels by means of at least one of sintering or gluing.

11. The regenerator of claim 1, in which the one or more independent regenerative networks are made of enclosed tubes, wherein regenerative materials are filled in flow passages between tubes.

12. The regenerator of claim 11, further comprising:
two or more layers of regenerative networks, each network formed from a said hollow tube,
vertically extending tubes connecting two or more layers of the one or more regenerative networks to become an independent regenerative network.

13. The regenerator of claim 1, wherein the one or more independent regenerative networks are formed from a tube having a coiled, mesh or serpentine configuration.

* * * * *